United States Patent
Fukumoto et al.

(10) Patent No.: US 8,801,883 B2
(45) Date of Patent: Aug. 12, 2014

(54) METHOD FOR PRODUCING FIXING-UNIT MEMBER AND FIXING-UNIT MEMBER

(75) Inventors: Yasuhiro Fukumoto, Sennan-gun (JP); Hiromi Kamimura, Sennan-gun (JP); Shingo Harada, Sennan-gun (JP); Naoki Yokota, Sennan-gun (JP)

(73) Assignee: Sumitomo Electric Fine Polymer, Inc., Sennan-gun, Osaka (JP)

( * ) Notice: Subject to any disclaimer, the term of this patent is extended or adjusted under 35 U.S.C. 154(b) by 293 days.

(21) Appl. No.: 13/050,576

(22) Filed: Mar. 17, 2011

(65) Prior Publication Data

US 2011/0236691 A1 Sep. 29, 2011

(30) Foreign Application Priority Data

Mar. 23, 2010 (JP) .................................. 2010-065807

(51) Int. Cl.
- *B32B 37/00* (2006.01)
- *B29C 65/00* (2006.01)
- *B29C 65/66* (2006.01)
- *B29C 65/78* (2006.01)
- *B32B 37/14* (2006.01)

(52) U.S. Cl.
CPC ............. *B29C 65/66* (2013.01); *B29C 65/7838* (2013.01); *B29C 66/7371* (2013.01); *B32B 37/144* (2013.01)
USPC ........................... 156/86; 156/294; 156/308.2

(58) Field of Classification Search
CPC ........... G03G 15/2053; G03G 15/2057; B29C 65/66; B29C 65/7838; B29C 66/5221; B29C 66/7371; B29C 61/02; B29C 63/42; B32B 37/04; B32B 37/144; B32B 2038/0088
USPC ......... 156/85, 86, 293, 294, 308.2, 309.6, 84; 492/56; 399/330, 331, 333
See application file for complete search history.

(56) References Cited

U.S. PATENT DOCUMENTS 3,435,500 A 4/1969 Aser et al.
4,883,715 A * 11/1989 Kuge et al. .................... 428/421
(Continued)

FOREIGN PATENT DOCUMENTS

GB 2405111 A * 2/2005
JP 47-20747 6/1972
(Continued)

OTHER PUBLICATIONS

Machine translation of JP 2009222783 date unknown.*
(Continued)

*Primary Examiner* — John Goff
(74) *Attorney, Agent, or Firm* — Drinker Biddle & Reath LLP

(57) ABSTRACT

A method for producing a fixing-unit member including a base, a rubber elastic layer, and a PFA layer includes a step of forming a primer layer by applying a primer containing a low-melting fluorocarbon resin to the outer circumferential surface of a rubber roller having the rubber elastic layer on the outer circumferential surface of the base; a step of sheathing the rubber roller with a thermally shrinkable tube formed by diametrically expanding a PFA tube so as to have an inner diameter more than the outer diameter of the rubber roller; a step of forming the PFA layer from the thermally shrinkable tube by heating the thermally shrinkable tube so as to be thermally shrunken and fused with the rubber roller; and a reheating step of heating the PFA layer to a temperature equal to or higher than the melting point of the PFA contained in the PFA layer.

10 Claims, 2 Drawing Sheets

(56) References Cited

U.S. PATENT DOCUMENTS

| | | | |
|---|---|---|---|
| 5,968,623 A * | 10/1999 | Takeuchi et al. | 428/36.91 |
| 2009/0047048 A1* | 2/2009 | Ikeda et al. | 399/333 |
| 2010/0104335 A1* | 4/2010 | Kamimura et al. | 399/333 |

FOREIGN PATENT DOCUMENTS

| JP | 64-001534 | | 1/1989 |
|---|---|---|---|
| JP | 2002-031979 A | | 1/2002 |
| JP | 2003-255643 A | | 9/2003 |
| JP | 2004-276290 | | 10/2004 |
| JP | 2005-238764 A | | 9/2005 |
| JP | 2007137502 A | * | 6/2007 |
| JP | 2008-200954 A | | 9/2008 |
| JP | 2009222783 A | * | 10/2009 |
| WO | 2008/126915 | | 10/2008 |

OTHER PUBLICATIONS

"Thermal Conductivity of some common Materials" from engineeringtoolbox.com as captured by archive.org on Dec. 28, 2009.*

Machine translation of JP 2007137502 date unknown.*

* cited by examiner

METHOD FOR PRODUCING FIXING-UNIT MEMBER AND FIXING-UNIT MEMBER

BACKGROUND OF THE INVENTION

1. Field of the Invention

The present invention relates to a method for producing a member (e.g., a fixing roller, a fixing belt, a pressing roller, or a pressing belt) used in a fixing unit of office automation (OA) equipment such as a copier; and such a fixing-unit member.

2. Description of the Related Art

In general, an image-forming apparatus such as an electrophotographic copier, a facsimile, or a laser-beam printer forms an image by, for example, a charging step of uniformly charging a photosensitive drum; an exposure step of exposing an image to form an electrostatic latent image on the photosensitive drum; a development step of making toner adhere to the electrostatic latent image to form a toner image; a transfer step of transferring the toner image on the photosensitive drum onto a receiver such as a paper sheet or a synthetic-resin sheet; a fixing step of fixing the unfixed toner image on the receiver; and a cleaning step of removing residual toner on the photosensitive drum.

In these steps, various roller members and/or belt members are used such as a charging roller/belt, a transfer roller/belt, a development roller/belt, a fixing roller/belt, and a pressing roller/belt. These members are required to have functions according to their usage.

For example, in the fixing step, an unfixed toner image on the receiver is generally fixed on the receiver by being heated and pressed. In an existing fixing unit (fixing section) that fixes toner images by heating and pressing, a cylindrical fixing roller and a cylindrical pressing roller are disposed so as to face each other; a receiver having an unfixed toner image thereon is passed through the nip between these rollers so that the unfixed toner image is heated and pressed to thereby be fixed on the receiver. The fixing roller has a heater such as an electric heater therein and controls the surface temperature of the fixing roller with the heater. However, the time it takes the surface temperature of such a fixing roller to be increased to the fixing temperature with such an internal heater is long. Thus, the waiting time from the turning-on of power to the operable state is long, which is problematic.

To address this problem, a fixing unit in which a heater is disposed so as to face a pressing roller with a rotatably supported thin fixing belt therebetween has been developed in recent years. By passing a receiver having an unfixed toner image thereon through the nip between the thin fixing belt and the pressing roller, heat provided by the heater substantially directly propagates to the unfixed toner image through the thin fixing belt. Thus, a fixed toner image can be formed after a very short waiting time from the turning-on of power.

In recent years, an increase in print (printing and copying) speed, output of full-color images, and a decrease in power consumption have been demanded for image-forming apparatuses. To increase the print speed, the heating efficiency of the fixing unit needs to be increased to thereby rapidly fix unfixed toner images on receivers.

To form a full-color image, in the development step, development is performed sequentially with color toners such as cyan toner, magenta toner, yellow toner, and black toner to form color-toner images; and, in the transfer step, the color-toner images are transferred onto a receiver so as to be sequentially stacked on top of one another. In addition, in the fixing step, such a multicolor unfixed toner image, which is thicker than a single-color unfixed toner image, is heated and pressed in such a manner that the toners are melted without causing mixing of colors to thereby fix the unfixed toner image on a receiver. For this reason, the fixing unit needs to have a high heating efficiency.

In an image-forming apparatus, the fixing unit consumes a large amount of energy. Thus, to achieve energy saving, the power used for heating in the fixing unit is desirably decreased or the heating efficiency during the fixing is desirably increased. An increase in the heating efficiency in the fixing unit can lead to saving of electric power.

In various members of such an image-forming apparatus, a fixing roller/belt and a pressing roller/belt of the fixing unit used in the fixing step are required to (1) have surfaces from which toner is readily released so that unfixed toner on receivers does not adhere to the surfaces; (2) have an excellent thermal conductivity such that unfixed toner images can be efficiently fixed on receivers; and (3) have excellent durability so as to provide stable functions for a long period of time. In the specification, a fixing roller, a fixing belt, a pressing roller, and a pressing belt are collectively referred to as a "fixing-unit member". Note that such a fixing belt may be used in the form of an endless belt or a sleeve and may be incorporated as, for example, a fixing sleeve into a fixing unit.

To satisfy such requirements, a fixing-unit member is used in which a layer of a fluorocarbon resin, which is a material excellent in terms of toner releasability, heat resistance, and durability, is formed on the surface of a rubber roller constituted by a base and a rubber elastic layer.

Such a fluorocarbon-resin layer is formed of one or more fluorocarbon resins such as a tetrafluoroethylene-hexafluoropropylene copolymer (FEP), polytetrafluoroethylene (PTFE), an ethylene-tetrafluoroethylene copolymer (ETFE), polychlorotrifluoroethylene (PCTFE), an ethylene-chlorotrifluoroethylene copolymer (ECTFE), and polyvinylidene fluoride. In particular, a tetrafluoroethylene-perfluoro(alkyl vinyl ether) copolymer (PFA) is preferably used.

PFAs have sufficiently high heat resistance, melt flowability, and extrusion formability and fluorocarbon-resin layers formed of PFAs are excellent in terms of toner releasability, surface smoothness, and the like. PFAs generally have a lower melting point (about 280° C. to 320° C.) than PTFE, which is also a fluorocarbon resin. Thus, compared with a PTFE layer, a PFA layer can be formed on the rubber elastic layer of a rubber roller at a low temperature and hence the rubber elastic layer does not become deteriorated.

For example, a fixing-unit member having a fluorocarbon-resin layer on its surface can be produced as follows. A fixing roller having a fluorocarbon-resin layer may be produced by a method in which a fluorocarbon-resin coating solution is applied to the inner surface of a mold and baked to be turned into a hollow cylindrical cured membrane; a roller shaft is then inserted along the longitudinal axis of the mold and liquid rubber is injected between the cured membrane and the roller shaft; and the rubber is thermally vulcanized. Alternatively, a fluorocarbon-resin layer may be formed on the surface of a roller including a metal shaft and a rubber elastic layer and the like formed around the metal shaft, by applying a fluorocarbon-resin coating solution to the surface of the roller and baking the applied solution.

However, in such a method using a mold, when a fixing roller is released from the mold, there are cases where a portion of a fluorocarbon-resin layer comes off or wrinkles are generated in the fluorocarbon-resin layer. Use of a mold increases the production cost, which is also problematic. In the method of applying a fluorocarbon-resin coating solution, the baking temperature of the fluorocarbon resin is higher than the upper temperature limit of a rubber elastic layer and hence there are cases where the rubber elastic layer becomes deteriorated.

Japanese Unexamined Patent Application Publication No. 64-1534 proposes a method in which a thermally flowable fluorocarbon-resin thermally shrinkable tube is fixed by being shrunken onto a cylindrical article having been coated with a primer, and the tube and the article are then thermally fused together at a temperature equal to or higher than the melting point of the fluorocarbon resin. However, in this method, the fusion temperature is 330° C. to 400° C. and hence the rubber elastic layer may become deteriorated.

Japanese Examined Patent Application Publication No. 47-20747 and the like propose a method for producing a fixing roller in which a thermally shrinkable fluorocarbon-resin tube is thermally shrunken to be fixed onto a rubber roller. However, this method requires an extra production step of treating the inner surface of the thermally shrinkable fluorocarbon-resin tube, which complicates the production. In addition, the adhesion strength between the tube and the rubber roller is unstable and the durability of the adhesion between the tube and the rubber roller is low, which are problematic.

International Publication No. 2008/126915 describes a method for producing a fixing roller or a fixing belt by sequentially forming an elastic layer and a surface layer on a base in which a PFA-containing adhesive is applied to the outer circumferential surface of the elastic layer; this elastic layer is sheathed with a thermally shrinkable PFA tube having an inner circumferential diameter slightly larger than the outer circumferential diameter of the elastic layer; and the PFA tube and the adhesive are then heated at a temperature equal to or higher than the melting points of the PFA tube and the PFA contained in the adhesive such that the PFA tube is 3% to 20% thermally shrunken and the outer circumferential surface of the elastic layer and the inner circumferential surface of the PFA tube are bonded together through the adhesive to thereby form a PFA layer serving as a surface layer on the elastic layer.

Japanese Unexamined Patent Application Publication No. 2004-276290 describes a method for producing a fluorocarbon-resin-coated roller in which an adhesive having a low viscosity is applied to the inner circumferential surface of a fluorocarbon-resin tube having an inner diameter smaller than the outer diameter of a roller base (corresponding to a rubber roller) and/or the outer circumferential surface of the roller base; and then the roller base is sheathed with the fluorocarbon-resin tube while an end of the fluorocarbon-resin tube is diametrically expanded and, during this sheathing, the adhesive functions as a lubricant. This publication states that, in this method, since the roller base is sheathed with the fluorocarbon-resin tube having an inner diameter smaller than the outer diameter of the roller base while an end of the fluorocarbon-resin tube is diametrically expanded, the fluorocarbon-resin tube does not become wrinkled and, in addition, the fluorocarbon-resin tube and the roller base can be tightly bonded together.

SUMMARY OF THE INVENTION

When a rubber roller is sheathed with a thermally shrinkable PFA tube and the PFA tube is thermally shrunken, in the case where the PFA tube before being diametrically expanded (being expanded in a radial direction) has an inner diameter more than the outer diameter of the elastic layer of the rubber roller, the PFA tube being shrunken scarcely applies pressure to the rubber roller. Thus, the air tends to remain and form bubbles between the shrunken PFA tube and the rubber roller. The presence of bubbles decreases the thermal conductivity of portions of the roller or belt corresponding to the bubbles. Accordingly, there are cases where fixing failure is caused or delamination starting from such portions corresponding to bubbles is caused in the roller or belt.

When a thermally shrinkable PFA tube that has, before being diametrically expanded, an inner diameter equal to or less than the outer diameter of a rubber roller is used, by thermally shrinking the PFA tube, the PFA tube applies pressure to the rubber roller to thereby squeeze out bubbles and hence bubbles are less likely to remain between the PFA tube and the rubber roller. However, the PFA tube is not shrunken to the extent of having the inner diameter of the unexpanded PFA tube and the internal stress of the PFA tube is not completely eliminated. Accordingly, there are cases where axial cracks are generated in the roller or belt being used.

Specifically, although such a PFA tube is generally produced by extrusion, for example, by the flow of the melted PFA resin or change in the composition of the PFA resin due to local temperature variation occurring while the PFA resin is passed through a mesh or breaker plate for removing foreign matter in the extruder, the PFA resin becomes oriented along the flow of the melted PFA resin. In addition, by diametrically expanding such a PFA tube to form a thermally shrinkable tube, internal stress accumulates in the diametrical direction. When a PFA tube having an inner diameter equal to or less than the outer diameter of a rubber roller is diametrically expanded to provide a thermally shrinkable tube, the internal stress of the tube is not sufficiently released in the temperature range of thermally shrinking the tube and does remain. Thus, when such a fixing-unit member is heated or bent during usage, stress becomes concentrated in the resin-oriented direction and axial cracks are sometimes generated. In particular, when a fixing belt is used as a fixing sleeve, to reduce the frictional resistance between the fixing sleeve (fixing belt) and a heater or a guide member for the fixing sleeve, lubricating grease such as a fluorocarbon resin is applied to the fixing sleeve. However, there are cases where the lubricating grease adheres to and permeates the inner surface of the fixing sleeve and cracks are generated in the fixing sleeve.

An object of the present invention is to provide a method for producing a fixing-unit member such as a roller or a belt in which generation of axial cracks is suppressed.

The present invention provides a method for producing a fixing-unit member including a base, a rubber elastic layer, and a PFA layer, by sheathing a rubber roller including the rubber elastic layer on the outer circumferential surface of the base, with a thermally shrinkable tube formed by diametrically expanding a PFA tube having an inner diameter equal to or less than the outer diameter of the roller to an inner diameter more than the outer diameter of the roller, and by thermally shrinking the thermally shrinkable tube to form the PFA layer on the outer circumferential surface of the rubber roller. Thus, an object of providing a fixing-unit member in which bubbles are less likely to remain between the rubber roller and the PFA layer is achieved. Specifically, an object of the present invention is to provide a method for producing a fixing-unit member in which generation of axial cracks in the fixing-unit member during long-term usage can be effectively suppressed, the generation having been caused in existing fixing-unit members due to residual stress in the PFA layer on the outer circumferential surface of the rubber roller.

The inventors of the present invention have performed thorough studies on how to achieve the object. As a result, the inventors have conceived that, by thermally shrinking a thermally shrinkable tube (formed by diametrically expanding a PFA tube) so as to be fused with a rubber roller and to serve as a PFA layer on the outer circumferential surface of the rubber roller, and by subsequently heating the PFA layer to a temperature equal to or higher than the melting point of the PFA contained in the PFA layer; the internal stress of the PFA layer (thermally shrunken PFA tube) is released and removed to thereby suppress the generation of axial cracks in the roller or belt.

According to an aspect of the present invention, a method for producing a fixing-unit member including a base, a rubber elastic layer, and a tetrafluoroethylene-perfluoro(alkyl vinyl ether) copolymer (PFA) layer containing 70 wt % or more of a PFA, includes:

(I) a primer-layer-forming step of forming a primer layer by applying a primer to an outer circumferential surface of a rubber roller prepared by forming the rubber elastic layer on an outer circumferential surface of the base, the primer containing a fluorocarbon resin that has a melting point equal to or lower than a melting point of the PFA contained in the PFA layer;

(II) a rubber-roller-sheathing step of sheathing the rubber roller including the primer layer, with a thermally shrinkable tube formed by diametrically expanding a PFA tube so as to have an inner diameter more than an outer diameter of the rubber roller including the primer layer, the PFA tube containing 70 wt % or more of the PFA and having an inner diameter equal to or less than the outer diameter of the rubber roller including the primer layer;

(III) a PFA-layer-forming step of forming the PFA layer from the thermally shrinkable tube by heating the thermally shrinkable tube around the rubber roller to a temperature equal to or higher than a crystallization temperature of the PFA contained in the thermally shrinkable tube so that the thermally shrinkable tube is thermally shrunken and is fused with the rubber roller including the primer layer, with the primer layer between the thermally shrinkable tube and the outer circumferential surface of the rubber roller; and (IV) a reheating step of heating the PFA layer to a temperature equal to or higher than the melting point of the PFA contained in the PFA layer.

In this method, the thermally shrinkable tube formed by diametrically expanding a PFA tube so as to have an inner diameter more than the outer diameter of the rubber roller is heated to a temperature equal to or higher than the crystallization temperature of the PFA contained in the tube so that the tube is thermally shrunken and is fused with the rubber elastic layer with the primer layer therebetween to thereby provide a PFA layer on the rubber elastic layer; and the PFA layer is then heated to a temperature equal to or higher than the melting point of the PFA. Thus, bubbles are less likely to be generated between the rubber elastic layer and the PFA layer and the internal stress of the PFA layer has been released. As a result, the method can provide a fixing-unit member such as a roller or belt in which, for a long period of time, the strength is maintained, generation of axial cracks in the PFA layer serving as a surface layer of the member is suppressed, and delamination of the surface layer is suppressed.

In the above-described method, in the PFA-layer-forming step, the temperature to which the thermally shrinkable tube is heated may be lower than the melting point of the PFA contained in the thermally shrinkable tube.

The above-described method may further include, after the reheating step, a rapid-cooling step of cooling the PFA layer at a rate of 200° C./min or higher.

In this case, the strength of the PFA layer is enhanced and a fixing-unit member that has a more smooth surface and a higher hardness can be produced.

In the above-described method, the PFA layer may have a thickness of 50 μm or less.

In the above-described method, the PFA tube may be formed by extrusion in a temperature range of 380° C. to 440° C.

In the above-described method, the PFA-layer-forming step may be performed while a metal shaft is inserted through the base.

In this case, the reheating step may be performed without the metal shaft inserted through the base.

In the above-described method, the base may be composed of a metal or a heat-resistant resin.

In the above-described method, the rubber elastic layer may be composed of a rubber composition containing a thermally conductive filler and at least one heat-resistant rubber selected from the group consisting of silicone rubber and fluorocarbon rubber.

In the above-described method, the fixing-unit member may be a fixing roller, a fixing belt, a pressing roller, or a pressing belt.

According to another aspect of the present invention, a fixing-unit member produced by such a method is provided.

Thus, a fixing-unit member such as a roller or a belt can be provided in which, bubbles are less likely to be generated and, for a long period of time, the strength is maintained, generation of axial cracks in the PFA layer serving as a surface layer of the member is suppressed, and delamination of the surface layer is suppressed.

In Figures, each mark expresses the following.

1 fixing roller, 2 base, 3 rubber elastic layer, 4 primer layer, 5 PFA layer, 21 fixing belt, 22 heater, 23 unfixed toner image, 24 receiver, 25 fixed toner image, 26 pressing belt, 27 rod-shaped pressing roller, 31 fixing roller, 32 heater, 33 unfixed toner image, 34 receiver, 35 fixed toner image, 36 pressing roller

DESCRIPTION OF THE PREFERRED EMBODIMENTS

Hereinafter, a fixing roller will be mainly described as a specific example; however, the description is also applicable to a fixing belt, a pressing roller, and a pressing belt.

Figure 1:
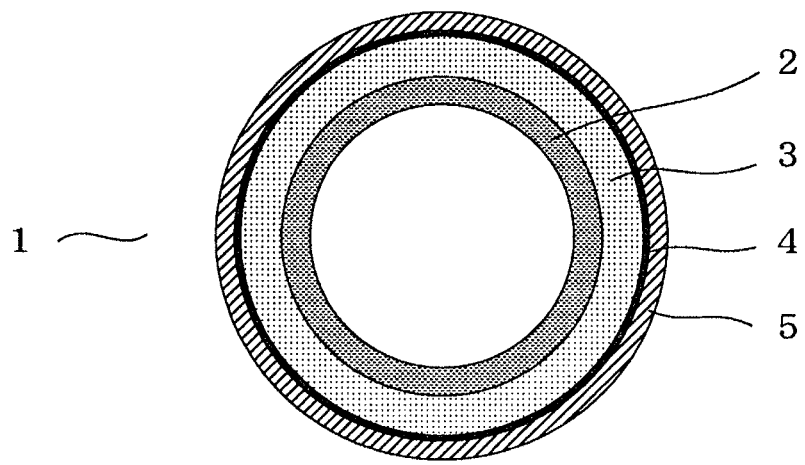
FIG. 1 is a sectional view of a fixing roller according to an embodiment of the present invention.
Figure 2:
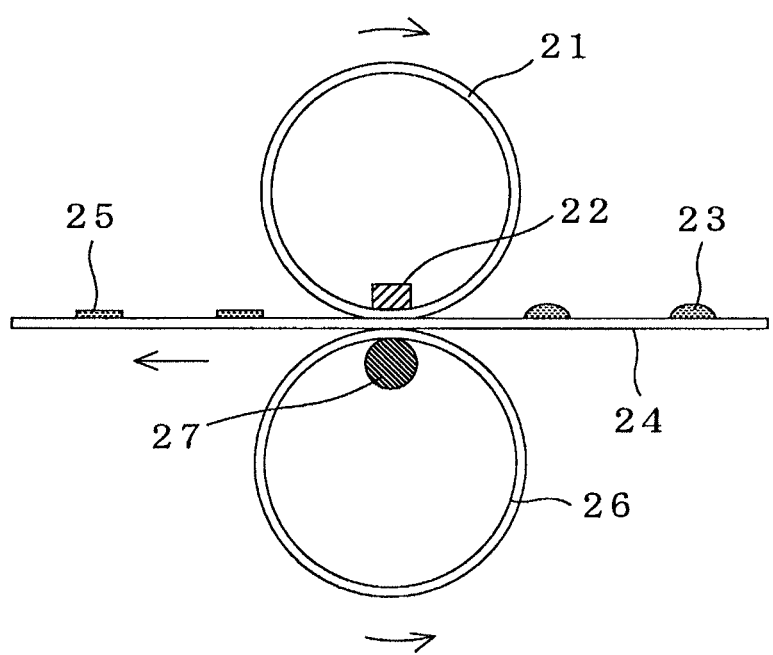
FIG. 2 is a sectional view of a fixing unit including a fixing belt and a pressing belt.
Figure 3:
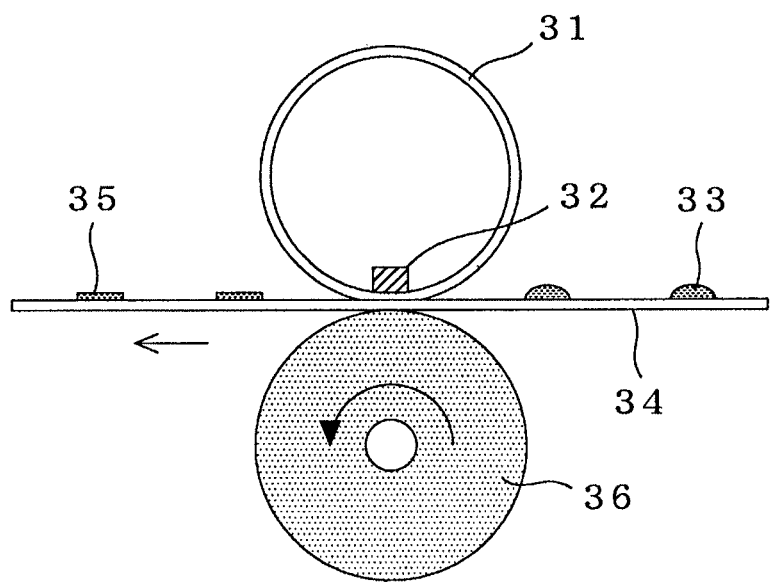
FIG. 3 is a sectional view of a fixing unit including a fixing belt and a pressing roller.

FIG. 1 is a schematic sectional view of a fixing roller produced in accordance with a production method according to an embodiment of the present invention. In FIG. 1, a fixing roller 1 includes a base 2, a rubber elastic layer 3, a layer 4 composed of a primer containing a fluorocarbon resin, and a PFA layer 5. In the case of a pressing roller, the pressing roller has a sectional configuration as in FIG. 1. In the case of a fixing belt or a pressing belt, such a belt has the configuration of the layers sequentially stacked in the order as in FIG. 1.

1. Base

A base having an outer circumferential surface according to an embodiment of the present invention may be selected from, for example, a hollow or solid cylindrical member and a metal or heat-resistant-resin tube having the shape of an endless belt (also referred to as a seamless belt).

In general, the hollow or solid cylindrical member is formed of a high-thermal-conductivity metal such as aluminum, an aluminum alloy, iron, or stainless steel; or a ceramic such as alumina or silicon carbide. The hollow or solid cylindrical member may have the form of a shaft having a bearing part in each end of the shaft.

The tubular base such as a metal tube or a heat-resistant-resin tube is a tube formed of a metal or a heat-resistant resin and is generally a member having the shape of an endless belt. Examples of the material of the metal tube include iron, nickel, alloys of the foregoing, and stainless steel.

When a fixing belt is heated by electromagnetic induction, the material of the metal tube is preferably iron, nickel, an alloy of the foregoing, or ferritic stainless steel. In the case of a fixing belt in which the whole belt member needs to be efficiently heated, a nickel belt or a stainless-steel belt, each of which has a low thermal capacity and can be more rapidly heated by electromagnetic induction, is preferably used as a metal tube.

The material of the heat-resistant-resin tube preferably has a low thermal capacity and can be rapidly heated by a heater. In general, a heat-resistant resin having an upper temperature limit of 250° C. or higher is used. The upper temperature limit serves as an indicator in terms of melting point, thermal deformation temperature, thermal decomposition temperature, or the like.

Specific examples of the heat-resistant resin include polyimide, polyamide imide, polyether ether ketone, polyphenylene sulfide, and polybenzimidazole. Of these, in view of heat resistance and durability, preferred are polyimide, polyamide imide, and polybenzimidazole; more preferred is polyimide; and particularly preferred is thermosetting polyimide.

The thickness, diameter, length, width, and the like of the base are appropriately selected in accordance with the application of a fixing-unit member. For example, in the case of a fixing belt or roller, the length and width of the base are determined in accordance with the width of a receiver. The diameter of the base can be appropriately selected in accordance with, for example, the application of a fixing-unit member or the type of an image-forming apparatus. In the case of a fixing belt or roller, the diameter of the base is often selected generally in the range of 10 to 150 mm, preferably in the range of 13 to 100 mm, and more preferably in the range of 15 to 40 mm.

In the case of a fixing roller, the thickness of the base formed of, for example, aluminum or iron, is 30 μm to 3 mm, preferably 40 μm to 2 mm, and more preferably 50 μm to 1.5 mm. In the case of a fixing belt, the thickness of the base formed of, for example, stainless steel or a polyimide resin, is 10 to 100 μm: a representative thickness of the base formed of stainless steel is about 30 μm and a representative thickness of the base formed of a polyimide resin is about 50 μm.

The base may have a shape other than those having a single diameter in the longitudinal direction, such as a crown shape, a reverse-crown shape, or a tapering shape.

When a heat-resistant-resin tube is used, if necessary, the tube may be made to contain an inorganic filler. Examples of the inorganic filler include silica, alumina, silicon carbide, boron carbide, titanium carbide, tungsten carbide, silicon nitride, boron nitride, aluminum nitride, mica, potassium titanate, barium titanate, calcium carbonate, magnesium oxide, zirconium oxide, and talc. Of these, preferred are alumina, silicon carbide, boron carbide, and boron nitride, each of which has a high thermal conductivity. The content of such an inorganic filler relative to the total amount of the compositions forming a heat-resistant-resin tube is generally 5 to 40 wt %, preferably 10 to 30 wt %, and more preferably 15 to 25 wt %.

2. Rubber Elastic Layer

A rubber elastic layer is formed on the base. A member provided by forming a rubber elastic layer on the outer circumferential surface of the base is referred to as a rubber roller. The material of the rubber elastic layer is preferably a heat-resistant rubber. When a fixing belt having a rubber elastic layer composed of such a heat-resistant rubber is incorporated into a fixing unit, the rubber elastic layer has sufficient heat resistance to endure the fixing temperature during continuous use.

The heat-resistant rubber is preferably a millable or liquid silicone rubber or fluorocarbon rubber or a mixture of the foregoing, each of which has particularly high heat resistance. Specific examples include silicone rubbers such as dimethyl silicone rubber, fluorosilicone rubber, methylphenyl silicone rubber, and vinyl silicone rubber; and fluorocarbon rubbers such as vinylidene fluoride rubber, tetrafluoroethylene-propylene rubber, tetrafluoroethylene-perfluoro (methyl vinyl ether) rubber, phosphazene-based fluorocarbon rubber, and fluoropolyether. These rubbers may be used alone or in combination. A silicone rubber and a fluorocarbon rubber may be used in combination.

In particular, liquid silicone rubbers and fluorocarbon rubbers are preferred because such a rubber can be mixed with a large amount of a thermally conductive filler and a rubber elastic layer having a high thermal conductivity can be readily formed from the mixture. Liquid silicone rubbers are categorized into condensation-type liquid silicone rubbers and addition-type liquid silicone rubbers. Of these, addition-type liquid silicone rubbers are preferred.

Such an addition-type liquid silicone rubber employs a mechanism in which the addition reaction is caused between a polysiloxane having vinyl groups and a polysiloxane having Si—H bonds by using a platinum catalyst to thereby crosslink siloxane chains. By changing the type or amount of the platinum catalyst or using an inhibitor (retarder), the setting speed of the rubber can be freely controlled. Binary-component rubbers that rapidly set at room temperature are room-temperature-setting rubbers. Binary-component rubbers that are adjusted so as to set under heating in the temperature range of 100° C. to 200° C. by changing the amount of a platinum catalyst or using an inhibitor are thermosetting rubbers. Single-component thermosetting rubbers (hereafter, referred to as "single-component addition-type liquid silicone rubbers") contain an inhibitor having a stronger inhibiting action, remain in the form of liquid even in the state of a mixture (single component) as long as being stored at a low temperature, and exhibit rubbery characteristics by being set under heating at the point of use. Of such addition-type liquid silicone rubbers, single-component addition-type liquid silicone rubbers are preferred in view of ease of mixing such a rubber with a thermally conductive filler, ease of forming a rubber elastic layer, and high adhesion with another layer. An example of the single-component addition-type liquid silicone rubbers is a commercially available product SE6920 (trade name, manufactured by Dow Corning Toray Co., Ltd.).

The rubber elastic layer can be made to contain a thermally conductive filler so as to have a higher thermal conductivity. In the case of a fixing belt or roller, the rubber elastic layer generally has a thermal conductivity of 0.6 to 4.0 W/(m·K), preferably 0.9 to 3.0 W/(m·K), and more preferably 1.0 to 2.5 W/(m·K). In particular, when a rubber elastic layer having a high thermal conductivity is required, the rubber elastic layer is preferably made to have a thermal conductivity of 1.1

W/(m·K) or higher and, more preferably 1.2 W/(m·K) or higher. When a rubber elastic layer has too low a thermal conductivity, the heating efficiency in the fixing roller or fixing belt is poor and it is difficult to achieve sufficiently high fixability in high-speed printing or full-color printing. When a rubber elastic layer has too high a thermal conductivity, the content of the thermally conductive filler is too high and there are cases where the rubber elastic layer has poor mechanical strength or poor elasticity.

Examples of the thermally conductive filler include electrical-insulating inorganic fillers such as silicon carbide (SiC), boron nitride (BN), alumina ($Al_2O_3$), aluminum nitride (AlN), potassium titanate, mica, silica, titanium oxide, talc, and calcium carbonate. These thermally conductive fillers may be used alone or in combination. Of these, silicon carbide, boron nitride, alumina, and aluminum nitride are preferred.

Such a thermally conductive filler generally has an average particle size of 0.5 to 15 μm and, preferably, 1 to 10 μm. The average particle size can be measured with a laser diffraction particle size analyzer (SALD-3000, manufactured by SHIMADZU CORPORATION). When the thermally conductive filler has too small an average particle size, the effect of enhancing thermal conductivity tends to be not sufficiently provided. When the thermally conductive filler has too large an average particle size, there are cases where the rubber elastic layer has surface irregularities and the surface smoothness of the PFA layer on the rubber elastic layer is poor.

The percentage of such a thermally conductive filler mixed relative to the total amount of the compositions forming a rubber elastic layer is generally 5 to 60 wt %, preferably 10 to 50 wt %, and more preferably 15 to 45 wt %. When the amount of a thermally conductive filler mixed is too small, it is difficult to sufficiently increase the thermal conductivity of the rubber elastic layer. When the amount of a thermally conductive filler mixed is too large, the rubber elastic layer tends to have low mechanical strength or low elasticity.

Although a composition that contains a thermally conductive filler and is used for forming a rubber elastic layer may be prepared by mixing a rubber material with the thermally conductive filler, if necessary, a commercially available product may be used. An example of such a commercially available product is a single-component addition-type liquid silicone rubber containing a thermally conductive filler such as silicon carbide (SiC) (X32-2020, manufactured by Shin-Etsu Chemical Co., Ltd.).

Although the thickness of the rubber elastic layer can be appropriately determined in accordance with, for example, the application or shape (belt or roller) of the fixing-unit member, the thickness is generally 10 μm to 7 mm, and preferably 50 μm to 3 mm. When the fixing-unit member is a roller including a hollow or solid cylindrical member serving as a base, since the base is hard, the rubber elastic layer preferably has a thickness of 50 μm to 5 mm, more preferably 150 μm to 4 mm, and particularly preferably 300 μm to 3 mm. When the fixing-unit member is a belt including a metal tube or a heat-resistant-resin tube serving as a base, in consideration of the elasticity of the base, the rubber elastic layer preferably has a thickness of 10 μm to 1.5 mm, more preferably 50 μm to 1 mm, and particularly preferably 100 to 800 μm; and, in most cases, a rubber elastic layer having a thickness of 200 to 350 μm provides a satisfactory result.

In the case of a fixing roller or fixing belt, the rubber elastic layer desirably has a low hardness so as to impart elasticity to the fixing roller or fixing belt. The hardness of the rubber elastic layer can be determined by the spring hardness test A-type defined in JIS K6301 (hereafter, the hardness determined by the test is referred to as "JIS-A hardness"). The rubber elastic layer preferably has a JIS-A hardness of less than 100, more preferably 10 to 50, still more preferably 10 to 40, and particularly preferably 10 to 30.

When the rubber elastic layer has too small a thickness or too high a hardness, the fixing belt or roller cannot melt unfixed toner so as to wrap it and hence fixability is poor. In particular, in the case of using color toner, fixing failure tends to be caused. When the rubber elastic layer has too large a thickness or too low a hardness, there are cases where sufficiently high durability is not achieved.

3. Formation of Rubber Roller

The formation of a rubber roller in which a rubber elastic layer is provided on the outer circumferential surface of a base is preferably performed by, for example, a press vulcanization method employing a mold or a method (dispenser method) in which liquid rubber is supplied from a dispenser onto the base to form a coating layer and the coating layer is vulcanized. When the base is a metal tube or a heat-resistant-resin tube, to employ the press vulcanization method, press vulcanization is preferably performed after a hollow or solid cylindrical support is inserted through the metal tube or the heat-resistant-resin tube. An adhesive for a rubber elastic layer or a primer may be applied to the base to form a thin film (not shown). To enhance the adhesion strength between the base and the adhesive layer for the rubber elastic layer, a very thin silicon-oxide layer may be formed on the outer circumferential surface of the base and then an adhesive for the rubber elastic layer or a primer may be applied to the outer circumferential surface of the silicon-oxide layer. When the press vulcanization method employing a mold is performed, for example, a base is placed along the longitudinal axis of a hollow cylindrical mold; a rubber material is injected into the gap between the inner surface of the hollow cylindrical mold and the outer circumferential surface of the base; and the rubber material is then heated and vulcanized to form the rubber elastic layer. Alternatively, the vulcanization of the rubber elastic layer may be performed after the rubber roller is sheathed with a thermally shrinkable tube.

When the dispenser method is employed, a rubber elastic layer is formed on a base by a step (1) in which, while the base is rotated, liquid rubber is continuously supplied to the surface of the base from a dispenser having a supply section having a liquid ejection port at the tip and, at this time, by continuously moving the supply section in the rotational-axis direction of the base, the liquid rubber supplied from the liquid ejection port is spirally wound around the surface of the base to thereby form an applied layer of the liquid rubber; and a step (2) in which the applied liquid rubber is cured (vulcanized) to thereby form the rubber elastic layer on the base. Such liquid rubber generally has a viscosity (measured at 25° C.) of 1 to 1,500 Pa·s and, preferably 5 to 1,000 Pa·s. As described above, such liquid rubber may be made to contain a thermally conductive filler.

4. Primer-Layer-Forming Step

The primer layer is formed for the purpose of enhancing the adhesion strength between the rubber roller and the PFA layer. The rubber roller is produced by forming a rubber elastic layer on the outer circumferential surface of a base. The PFA layer is formed from a thermally shrinkable tube. The primer layer is formed by applying a primer to the outer circumferential surface of the rubber roller, the primer containing a fluorocarbon resin (hereafter, sometimes referred to as a "low-melting fluorocarbon resin") having a melting point equal to or lower than the melting point of a PFA contained in the PFA layer. The low-melting fluorocarbon resin may be a PFA, FEP, or the like.

The method of applying such a primer containing a low-melting fluorocarbon resin is not particularly limited as long as a primer layer having a thickness of 1 to 5 µm, preferably about 2 to 4 µm, can be formed. For example, a dispersion prepared by dispersing a low-melting fluorocarbon resin in a dispersion medium may be applied by dipping, spin-coating, spraying, roll-coating, or the like. The applied primer is then dried to form a primer layer on the rubber roller. This drying is preferably performed by evaporating the dispersion medium for the low-melting fluorocarbon resin at room temperature and then gradually increasing the temperature to thereby dry the primer so as not to contain bubbles. Compared with the outer diameter of the rubber roller, the thickness of the primer layer is very small. Thus, the outer diameter of the rubber roller including the primer layer can be regarded as being substantially the same as the outer diameter of the rubber roller. Accordingly, hereafter, "the outer diameter of the rubber roller including the primer layer" is sometimes simply referred to as "the outer diameter of the rubber roller".

When the primer containing a low-melting fluorocarbon resin is an aqueous PFA dispersion (solution in which PFA fine particles have been dispersed in water) containing 20 to 30 wt % of a PFA, this primer can be applied by spraying and hence is suitable for forming thin films. An example of such a primer is PR-990CL (manufactured by DU PONT-MITSUI FLUOROCHEMICALS COMPANY, LTD.). The PFA contained in this material has a melting point of 290° C.

In an embodiment of the present invention, a thermally shrinkable tube that is prepared by diametrically expanding a PFA tube (expanding the PFA tube in the diametrical direction) is used as a material for forming the PFA layer (serving as the surface layer of the rubber roller); and the PFA layer and the rubber elastic layer of the rubber roller are bonded together through the primer containing a low-melting fluorocarbon resin. At this time, by heating the thermally shrinkable tube at a temperature equal to or higher than the crystallization temperature of the PFA contained in the thermally shrinkable tube, the thermally shrinkable tube (to serve as the PFA layer, that is, the surface layer of the rubber roller) is fused with the low-melting fluorocarbon resin in the primer layer to thereby provide a strong adhesion strength between the surface layer (PFA layer) and the primer layer. Thus, the necessity of subjecting the inner circumferential surface of a PFA tube to a plasma treatment, a chemical etching treatment, or the like has been eliminated. In addition, the necessity of inserting a jig for the inner-circumferential-surface treatment into a PFA tube has also been eliminated. Accordingly, a PFA tube having a small inner diameter can be used and a fixing roller having a small diameter can be provided. In addition, the heating is performed in a short time, deterioration of the rubber elastic layer can be suppressed.

5. PFA Layer

A fixing-unit member according to an embodiment of the present invention has, as a surface layer, a PFA layer containing 70 wt % or more of a PFA. By using such a surface layer containing a PFA, which is a fluorocarbon resin, a fluorocarbon-resin surface layer can be provided that has sufficiently high heat resistance, melt flowability, and extrusion formability and is excellent in terms of toner releasability, surface smoothness, or the like. The melting point of a PFA can be adjusted by changing, for example, the type of perfluoro(alkyl vinyl ether) or the copolymerization ratio of perfluoro(alkyl vinyl ether) to tetrafluoroethylene; however, the melting point is generally about 280° C. to 320° C. PFAs have a lower melting point than PTFE (polytetrafluoroethylene), which is also a fluorocarbon resin, and hence a PFA layer can be stacked on the rubber elastic layer at a low temperature, compared with a PTFE layer. Accordingly, deterioration of the rubber elastic layer is suppressed.

The PFA layer is a fluorocarbon-resin layer containing, as a fluorocarbon resin, 70 wt % or more of a PFA, preferably 80 wt % or more of a PFA, and more preferably 90 wt % or more of a PFA. The entirety of the fluorocarbon resin in the PFA layer may be a PFA. The PFA layer may contain less than 30 wt % of one or more fluorocarbon resins used for existing fixing-unit members, such as FEP, PTFE, ETFE, PCTFE, ECTFE, and PVDF, preferably less than 20 wt %, and more preferably less than 10 wt %. The PFA layer may contain a resin other than fluorocarbon resins as long as advantages of an embodiment according to the present invention such as sufficiently high heat resistance, toner releasability, and surface smoothness are achieved.

The PFA may be prepared by synthesis. Alternatively, commercially available PFAs such as 350-J, HP series (e.g., 451HP-J, 950HP-Plus, and 951HP-Plus), and PF-059 (these listed are manufactured by E. I. du Pont de Nemours and Company) may be used.

The PFA layer may be made to contain a filler for the purpose of enhancing wear resistance and releasability. The filler may be one or more selected from the group consisting of SiC, $SiO_2$, BN, $Al_2O_3$, and TiN. The particle size of the filler may be appropriately determined in accordance with the thickness of the PFA layer. The amount of the filler mixed may be 1 to 30 wt %, preferably 1 to 10 wt %, relative to the PFA layer.

The thickness (average thickness) of the PFA layer may be determined in consideration of the extrusion formability in the production of a PFA tube, rubber-roller-sheathing performability, durability, toner releasability, or the like; however, the thickness is generally 3 to 100 µm, preferably 5 to 80 µm, more preferably 10 to 50 µm, and particularly preferably 12 to 30 µm. When the PFA layer is too thin, the PFA layer tends to be poor in terms of rubber-roller-sheathing performability, durability, toner releasability, and the like; and extrusion formability in the production of the PFA tube is also poor. When the PFA layer is too thick and the fixing-unit member is a fixing roller or a fixing belt, power consumption required for heating in fixing increases. In summary, the PFA layer preferably has a thickness of 50 µm or less.

6. PFA Tube

A PFA tube used in an embodiment according to the present invention has an inner diameter equal to or less than the outer diameter of the rubber roller including a primer layer. Stated another way, the rubber elastic layer is formed such that the outer diameter of the resultant rubber roller is not less than the inner diameter of the PFA tube. When the PFA tube has an inner diameter more than the outer diameter of the rubber roller, the thermally shrunken tube cannot be tightly bonded to the outer circumferential surface of the rubber roller including the primer layer and bubbles remain between the resultant PFA layer and the rubber elastic layer. As a result, thermal-conduction failure partially occurs, which causes fixing failure. To avoid such a problem, an extra step of squeezing out bubbles is required, which increases the number of production steps. When the PFA tube has an inner diameter equal to the outer diameter of the rubber roller, for example, due to variation in operational conditions, there may be cases where the thermally shrunken tube cannot be tightly bonded to the outer circumferential surface of the rubber roller including the primer layer. Accordingly, the PFA tube preferably has an inner diameter smaller than the outer diameter of the rubber roller.

When the PFA tube has an inner diameter smaller than the outer diameter of the rubber roller, the difference between the inner diameter of the PFA tube and the outer diameter of the rubber roller is preferably 12% or less relative to the outer diameter of the rubber roller, more preferably 1% to 9%, and particularly preferably 2% to 6%. When this difference is too large, in the sheathing of the rubber roller with the thermally shrinkable tube under heating, the tube tends to non-elastically deform and, for example, sheathing performability and the durability and toner releasability of the fixing roller are poor. In contrast, when the diameter difference is too small, there may be cases where the PFA layer does not sufficiently apply pressure to the rubber roller and the adhesion between the PFA layer and the rubber roller including the primer layer is low. When the rubber roller including the primer layer has an outer diameter of, for example, 12 to 40 mm, the PFA tube preferably has an inner diameter of 11 to 38 mm.

The thickness of the PFA tube is substantially the same as the thickness (average thickness) of the PFA layer to be formed and is 5 to 100 preferably 10 to 30 μm, and more preferably 10 to 20 μm. When the thickness of the PFA tube is too small, the PFA tube tends to be poor in terms of sheathing performability for the rubber roller including the primer layer, durability, toner releasability, extrusion formability in the production, and the like. When the thickness of the PFA tube is too large and the fixing-unit member is a fixing roller or a fixing belt, power consumption required for heating in fixing increases.

For the PFA tube, commercially available PFAs such as 350-J, HP series (e.g., 451HP-J, 950HP-Plus, and 951HP-Plus), PF-059 (these listed are manufactured by E. I. du Pont de Nemours and Company), and 802UP (manufactured by Asahi Glass Co., Ltd.) may be used.

The PFA tube may be formed by extruding a PFA with an extruder equipped with a circular die into the shape of a tube in a temperature range of, for example, 380° C. to 440° C. and, preferably 400° C. to 440° C.

7. Thermally Shrinkable Tube

The thermally shrinkable tube used in an embodiment according to the present invention is formed by diametrically expanding the PFA tube that is described in the "6. PFA tube" above and that has an inner diameter equal to or less than the outer diameter of the rubber roller including a primer layer, so as to have an inner diameter more than the outer diameter of the rubber roller; and the thermally shrinkable tube is shrunken by heating.

As described above, the thermally shrinkable tube can be formed by extruding a PFA with an extruder equipped with a circular die into the shape of a tube in a temperature range of, for example, 380° C. to 440° C., preferably 400° C. to 440° C., so that a PFA tube having an inner diameter equal to or less than the outer diameter of the rubber roller including a primer layer is produced; and then by heating the PFA tube so that the PFA tube is diametrically expanded and the resultant tube has an inner diameter more than the outer diameter of the rubber roller. The method of diametrically expanding the PFA tube is not particularly limited. For example, the extruded PFA tube is cooled to the melting point thereof or lower and, while the air at room temperature or heated is blown into the PFA tube, the PFA tube is drawn at a predetermined drawing rate to thereby be biaxially stretched in the longitudinal direction (extrusion direction) and the transverse direction (diameter direction). Alternatively, the PFA tube may be diametrically expanded by temporarily sheathing a mandrel (if necessary, being heated) with the PFA tube, the mandrel having an outer diameter more than the inner diameter of the PFA tube, and by drawing the PFA tube at a predetermined drawing rate.

The draw ratio of the PFA tube in the formation of the thermally shrinkable tube may be appropriately selected in consideration of, for example, the inner diameter or the thickness of the PFA tube, the outer diameter of the rubber roller, the thermally shrinking percentage of the resultant thermally shrinkable tube, or internal stress that is to remain in the PFA layer provided by thermally shrinking the thermally shrinkable tube.

Accordingly, the draw ratio of the PFA tube can be appropriately determined in accordance with desired conditions in terms of tube inner diameter before and after the thermal shrinkage. However, to eliminate internal distortion, the draw ratio of the PFA tube is, both in the longitudinal direction and the transverse direction, generally 1.01 to 2.0 times, preferably 1.03 to 1.7 times, and more preferably 1.05 to 1.5 times.

The thermally shrinkable tube needs to have an inner diameter more than the outer diameter of the rubber roller; and the inner diameter is preferably 1.01 to 1.6 times, more preferably 1.03 to 1.4 times, and still more preferably 1.04 to 1.2 times, the outer diameter of the rubber roller. When the thermally shrinkable tube has too small an inner diameter, there are cases where it is difficult to insert the rubber roller into the thermally shrinkable tube, the PFA layer having a uniform thickness is not formed, and bubbles remain between the thermally shrunken tube (PFA layer) and the rubber roller. When the thermally shrinkable tube has too large an inner diameter, there are cases where the tube is not sufficiently shrunken and the resultant PFA layer and the rubber elastic layer are not tightly bonded together; or the tube is not uniformly shrunken and hence the PFA layer having a uniform thickness is not formed and bubbles remain between the PFA layer and the rubber roller.

The thermally shrinkable tube has a thickness such that, as a result of thermal shrinkage, the resultant PFA layer has a predetermined thickness (in terms of average thickness). Accordingly, the thermally shrinkable tube has a thickness of 2 to 80 μm, preferably 4 to 60 μm, and more preferably 8 to 40 μm. The thermally shrinkable tube preferably has a thermal shrinking percentage of 5% to 30% such that the thermally shrunken tube (PFA layer) has a predetermined thickness (in terms of average thickness) and the thermally shrunken tube uniformly applies pressure to the rubber elastic layer.

The thermally shrinkable tube is used to sheath the rubber roller including the primer layer and then is thermally shrunken. Subsequently, the thermally shrunken tube is cut so as to have a length of generally 1.05 to 1.9 times, preferably 1.08 to 1.7 times, the length of the rubber roller such that end portions of the rubber roller are not exposed.

It is not necessary to subject the thermally shrinkable tube to a treatment that is usually performed to enhance the adhesion between the tube and the rubber roller, such as roughening or surface modification of the inner circumferential surface of the thermally shrinkable tube. However, such roughening or surface modification of the inner circumferential surface of the thermally shrinkable tube may be performed. For example, the inner circumferential surface of the thermally shrinkable tube may be treated so as to have, in the circumferential direction, an arithmetic mean roughness Ra of 0.05 to 0.5 μm and, preferably 0.1 to 0.4 μm. When the Ra is 0.05 μm or more, bubbles are more sufficiently removed and a higher effect of suppressing the generation of bubbles can be provided. When the Ra is 0.5 μm or less, remaining of bubbles in recesses in the roughened surface can be sufficiently suppressed. The arithmetic mean roughness Ra can be measured by the method defined in JIS-B0601 (1994). Alternatively, the inner circumferential surface of the thermally shrinkable tube may be modified by an etching treatment, a plasma treatment, or the like. By subjecting the inner circumferential surface of the thermally shrinkable tube to such a surface modification treatment, the adhesion between the inner circumferential surface and the adhesive is enhanced and the adhesion between the inner circumferential surface and the rubber elastic layer is enhanced. Alternatively, the inner circumferential surface of the thermally shrinkable tube can be modified by, for example, irradiation with ultraviolet rays, irradiation with electron beams, ion irradiation, laser irradiation, or corona discharge. The thermally shrinkable tube may be a commercially available product.

8. Rubber-Roller-Sheathing Step

In the rubber-roller-sheathing step, the rubber roller including the primer layer is sheathed with the thermally shrinkable tube by moving the thermally shrinkable tube along the longitudinal axis of the rubber roller while the ends of the thermally shrinkable tube are held with chucks (not shown). Since the thermally shrinkable tube is formed so as to have an inner diameter more than the outer diameter of the rubber roller, the rubber roller can be readily sheathed with the thermally shrinkable tube without coming into contact with each other.

9. PFA-Layer-Forming Step

In the PFA-layer-forming step, the PFA layer is formed from the thermally shrinkable tube by heating the thermally shrinkable tube around the rubber roller including the primer layer to a temperature equal to or higher than the crystallization temperature of the PFA contained in the thermally shrinkable tube so that the tube is thermally shrunken and fused with the rubber roller, with the primer layer between the tube and the outer circumferential surface of the rubber roller.

Specifically, the rubber roller sheathed with the thermally shrinkable tube, if necessary, in a state in which the ends of the thermally shrinkable tube are lightly held with chucks, is heated to a temperature equal to or higher than the crystallization temperature of the PFA contained in the thermally shrinkable tube and, as a result, the tube is thermally shrunken to be tightly bonded to the rubber roller, and the tube being softened under heating and the rubber roller are fused together with a low-melting fluorocarbon resin being melted. Thus, the fixing roller can be provided. The low-melting fluorocarbon resin is contained in the primer layer and has a melting point of about 290° C. The PFA contained in the thermally shrinkable tube has a crystallization temperature of about 290° C. Accordingly, when the rubber roller sheathed with the thermally shrinkable tube is heated to a temperature equal to or higher than the crystallization temperature of the PFA contained in the thermally shrinkable tube, the low-melting fluorocarbon resin is melted or sufficiently softened. Those skilled in the art understand that thermally shrinkable tubes are thermally shrunken in such a temperature region.

Since the original inner diameter of the PFA tube is equal to or less than the outer diameter of the rubber roller, in the PFA layer formed by thermally shrinking the thermally shrinkable tube, the internal stress is not completely released or removed. Accordingly, since the PFA layer formed by thermally shrinking the thermally shrinkable tube applies pressure to the rubber roller, the PFA layer and the rubber roller can be tightly bonded together without the step of squeezing the thermally shrunken tube or externally applying pressure to the rubber roller. In addition, generation of bubbles is less likely to occur between the thermally shrinkable tube and the rubber roller. Even when bubbles are generated between the thermally shrinkable tube and the rubber roller, the bubbles are divided into very fine bubbles or released outside by the pressure applied by the tube being thermally shrunken. Thus, bubbles are less likely to remain between the resultant PFA layer and the rubber roller of the fixing roller.

When the heating temperature is made to be higher than the melting point of the PFA contained in the thermally shrinkable tube, there are cases where the PFA contained in the thermally shrinkable tube is melted and uniform shrinking of the tube is not achieved or the rubber elastic layer is thermally deteriorated. Accordingly, the heating temperature is preferably made to be a temperature equal to or higher than the crystallization temperature of the PFA contained in the thermally shrinkable tube and lower than the melting point of the PFA. Specifically, the heating temperature is preferably in the range of 290° C. to 320° C.-330° C. and, more preferably 290° C. to 320° C.

The time for which the heating is performed may be appropriately selected in accordance with the low-melting fluorocarbon resin contained in the primer layer, the PFA contained in the thermally shrinkable tube, the thickness of the thermally shrinkable tube, the diameter expansion ratio, or the like. However, the heating time is generally 5 to 100 minutes, preferably 10 to 80 minutes, and more preferably about 20 to 60 minutes.

The heating method for the PFA-layer-forming step is not particularly limited as long as the rubber roller sheathed with the thermally shrinkable tube can be heated to a predetermined temperature equal to or higher than the crystallization temperature of the PFA contained in the thermally shrinkable tube. However, the heating method may be selected from heating with an oven employing electric heating or high-frequency heating; pressing onto a hot plate; and the like.

When the rubber roller sheathed with the thermally shrinkable tube is heated with an oven, unless the tube is non-uniformly shrunken due to non-uniform heating, the rubber roller may be placed such that the longitudinal axis thereof is in the horizontal direction or in the vertical direction, or the rubber roller may be left to stand or moved, for example, rotated. To make the entire temperature of the rubber roller be uniform, in the PFA-layer-forming step, the rubber roller may be heated while a shaft formed of a metal such as aluminum is inserted through the base of the rubber roller.

Prior to the PFA-layer-forming step, by performing a preheating step of preheating the rubber roller sheathed with the thermally shrinkable tube to a temperature lower than the crystallization temperature of the PFA contained in the thermally shrinkable tube, the thermally shrinkable tube can be shrunken more uniformly. The preheating may be performed while a shaft formed of a metal such as aluminum is inserted through the base of the rubber roller. The temperature and time of the preheating may be appropriately selected in accordance with the PFA contained in the thermally shrinkable tube, the thickness of the thermally shrinkable tube, the diameter expansion ratio, the melting point of the low-melting fluorocarbon resin contained in the primer layer, or the like. However, the preheating temperature is generally 150° C. to 250° C., preferably 170° C. to 230° C., and more preferably 180° C. to 220° C.; and the preheating time is generally 5 to 100 minutes, preferably 10 to 80 minutes, and more preferably about 20 to 60 minutes.

10. Reheating Step

After the fixing roller formed in the PFA-layer-forming step is taken out from a heating apparatus such as an oven, in the reheating step, the fixing roller is reheated to a temperature equal to or higher than the melting point of the PFA contained in the PFA layer. In the reheating step, the PFA layer, which is formed by thermally shrinking the thermally shrinkable tube in the PFA-layer-forming step, is brought back to the state of being softened or partially melted and internal stress remaining in the PFA layer is released. When the PFA-layer-forming step is performed with a metal shaft being inserted through the roller, the reheating step may also be performed with the metal shaft being inserted through the roller. However, to release the internal stress with certainty, the metal shaft is preferably removed from the roller and then the reheating step is performed.

The reheating step is generally performed by placing the fixing roller in an oven set at a temperature equal to or higher than the melting point of the PFA contained in the PFA layer. Alternatively, the reheating step is performed by changing the temperature of the oven used in the PFA-layer-forming step. When the fixing roller is placed and reheated in an environment at a temperature 40° C. or more higher than the melting point of the PFA, depending on the time for which the fixing roller is placed in the environment, there are cases where the PFA layer is melted and flows. Accordingly, the reheating step is preferably performed at a temperature that is equal to or higher than the melting point of the PFA and is lower than "the melting point of the PFA+35° C."; and more preferably at a temperature that is higher than the melting point of the PFA and is lower than "the melting point of the PFA+25° C.". The time for which the reheating step is performed depends on the temperature environment. However, to bring the PFA layer into the state of being softened or partially melted and to prevent the PFA layer from being melted and flowing, the time is generally 2 to 30 minutes, preferably 3 to 20 minutes, and more preferably about 4 to 15 minutes.

11. Rapid-Cooling Step

After the reheating step, the fixing roller is taken out of the oven. The fixing roller may be left to cool to 20° C. to 40° C. or room temperature. Alternatively, the fixing roller may be treated with a rapid-cooling step in which the fixing roller is cooled at a rate of 200° C./min or higher, preferably 220° C./min or higher, and more preferably 230° C./min or higher, to 20° C. to 40° C. or room temperature. As a result, the surface of the PFA layer that has been softened and made smooth in the reheating step is maintained and hence the smoothness and hardness of the surface of the PFA layer can be further enhanced.

The method by which the rapid-cooling step is performed is not particularly limited as long as the surface of the PFA layer can be cooled at a rate of 200° C./min or higher. It will suffice that the PFA layer on the fixing roller can be exposed to a low-temperature atmosphere. For example, the fixing roller may be placed in a refrigerator or a freezer; the fixing roller may be immersed in a low-temperature solvent; or cold air may be blown to the PFA layer. In particular, cold air at 1° C. to 25° C., preferably 3° C. to 20° C., more preferably 5° C. to 15° C., is preferably blown to the PFA layer for 15 to 90 seconds, preferably 20 to 80 seconds, and more preferably 25 to 70 seconds.

When the cooling rate is lower than 200° C./min, there are cases where the rubber layer tends to deteriorate and the hardness of the rubber layer increases or the strength of the rubber layer decreases. When the PFA layer is too rapidly cooled at a rate higher than 800° C./min, there are cases where the surface of the PFA layer is non-uniformly cooled or condensation occurs. Accordingly, the rapid-cooling step is preferably performed at a cooling rate of 800° C./min or lower, preferably 700° C./min or lower, and more preferably 600° C./min or lower.

EXAMPLES

Hereinafter, an embodiment according to the present invention will be specifically described with reference to Examples and Comparative examples in which fixing belts are produced. However, the present invention is not restricted to these Examples.

Physical properties and characteristics were evaluated in the following manner.

1. Melting Point

The melting points of PFAs contained in a PFA tube and a primer were determined with a differential scanning calorimetry (Diamond DSC, manufactured by PerkinElmer Japan Co., Ltd.) in accordance with JIS K7121-1987. Specifically, 0.01 g of a sample was heated from 20° C. to 400° C. at a rate of 10° C./min, then cooled from 400° C. to 20° C. at a rate of 50° C./min, and subsequently heated again from 20° C. to 400° C. at a rate of 10° C./min. In the resultant DSC curve, a temperature corresponding to the top of the heat-of-fusion peak was defined as the melting point of the sample.

2. Thickness

The thickness of a PFA tube and a thermally shrinkable tube was measured by cutting each tube into a ring-shaped section having a width of 200 mm and measuring the section with a commercially available dial gauge.

3. Bubbles

Bubbles remaining between a PFA layer and a rubber elastic layer were evaluated in terms of the diameter (longitudinal diameter) and number by observing, with a microscope, regions that were 10 mm long in the axial direction and 2 mm long in the circumferential direction, the regions being freely selected from the outer circumferential surface of a fixing belt.

Evaluation criteria was as follows.

A: 10 or less bubbles having a diameter more than 0.5 mm were observed in a region.

B: More than 10 bubbles having a diameter more than 0.5 mm were observed and no bubbles having a diameter more than 1 mm were observed in a region.

C: Bubbles having a diameter of 1 mm or more remained in a region.

When bubbles in a fixing belt have a diameter of 0.5 mm or less, the bubbles do not expand nor increase bonding-failure portions during long-term usage of the fixing belt. Accordingly, such a fixing belt is evaluated as a good fixing belt. In contrast, when bubbles in a fixing belt have a diameter of 1 mm or more, the bubbles expand and probably increase bonding-failure portions during long-term usage of the fixing belt.

4. Cracks

Each fixing belt was incorporated as a fixing sleeve into the fixing unit of a commercially available electrophotographic copier. While the fixing temperature was maintained at 190° C., continuous printing was performed at a rate of 30 sheets (A4)/min for 200,000 sheets in total with a black toner. Then, the fixing belt was visually inspected for the presence of cracks in the inner circumferential surface and evaluated on the inspection result.

Evaluation criteria in terms of cracks was as follows.

A: After the continuous printing for 200,000 sheets in total, no cracks across the ends of the fixing belt nor partial cracks were observed.

B: No cracks across the ends of the fixing belt were observed; however one or more partial cracks in the axial direction were observed.

C: One or more cracks across the ends of the fixing belt were observed.

5. Adhesion Strength

The adhesion strength between the PFA layer and the rubber elastic layer was measured as follows. The surface of each fixing belt was cut along a width of 1 cm into the rubber elastic layer and a portion of the PFA layer was delaminated. A push-pull gauge was attached to the portion and the strength (gf/cm) with which the PFA layer was delaminated at an angle of 90° C. with respect to the circumferential direction was measured as the adhesion strength. The adhesion strength between the PFA layer and the rubber elastic layer needs to be 110 gf/cm or more, preferably 140 gf/cm or more, and more preferably 160 gf/cm or more.

6. Micro-Hardness

The micro-hardness of a PFA layer was measured with a micro durometer MD-1 A-type (manufactured by KOBUN-SHI KEIKI CO., LTD.) with the PEAK HOLD mode and a holding time of 1 second.

The tendency for the PFA layer to become scratched varies depending on the materials or thickness of the PFA layer, but it is strongly correlated with the micro-hardness of the PFA layer. When the PFA layer of a pressing roller is hard, by bringing the PFA layer into contact with receivers and toner repeatedly, countless fine scratches are formed in the PFA layer. It is known that toner particles adhere to such fine scratches, which may finally cause toner stain. The inventors of the present invention have performed thorough studies and have found that, when the same elastic layer is used, the tendency for the PFA layer to become scratched substantially governs the tendency for the roller to become stained. In a fixing belt according to an embodiment of the present invention, the PFA layer has a micro-hardness of 70 to 95, preferably 74 to 90, and more preferably 78 to 85.

Example 1 and Control Example 1

Regarding the Diameter of Thermally Shrinkable Tube

A stainless-steel belt having an outer diameter of 18 mm, a belt thickness of 30 μm, and an axial length of 250 mm was prepared as a base.

An aluminum shaft that snugly fit the inner circumferential surface of the stainless-steel belt was inserted through the belt. A felt sheet was impregnated with X-33-173 (manufactured by Shin-Etsu Chemical Co., Ltd.) and X-33-173 was lightly applied to the stainless-steel belt serving as the base, such that a primer layer having a thickness of 2 μm or less was formed with the felt sheet. Then, silicone rubber (trade name: SE6920, manufactured by Dow Corning Toray Co., Ltd.) was applied to the surface of the base. The applied rubber was heated and cured at 170° C. for 30 minutes to thereby form a rubber elastic layer having a thickness of 250 μm. The resultant rubber roller had an outer diameter of 18.5 mm.

PR-990CL (manufactured by DU PONT-MITSUI FLUO-ROCHEMICALS COMPANY, LTD.), which contains a PFA, was applied as a primer containing a low-melting fluorocarbon resin on the outer circumferential surface of the rubber roller at room temperature with a spraying coater. Thus, a primer layer having a thickness of 3 μm was formed. The PFA in the primer had a melting point of 290° C.

451HP-J (melting point: 310° C., crystallization temperature: 290° C., manufactured by E. I. du Pont de Nemours and Company), which was another PFA, was extruded into a PFA tube having an inner diameter of 17.5 mm and a wall thickness of 15 μm at 415° C. with an extruder equipped with a circular die. Then, while the air at room temperature was blown into the PFA tube, the PFA tube was stretched to 1.08 times the original length in the longitudinal direction (extrusion direction) and 1.12 times the original diameter in the transverse direction (diameter direction) and diametrically expanded so as to have an inner diameter of 19.3 mm. Thus, a thermally shrinkable tube was provided. The thermally shrinkable tube had a wall thickness of 13.5 μm.

The thermally shrinkable tube was cut so as to have a length of 350 mm. Four chucks were attached to each end of the thermally shrinkable tube and the rubber roller including the primer layer was inserted into the tube at room temperature. Since the inner diameter of the thermally shrinkable tube was larger than the outer diameter of the rubber roller, the rubber roller was readily inserted into the tube.

The rubber roller sheathed with the thermally shrinkable tube was preheated in an electric oven set at 200° C. for 30 minutes. Then, the rubber roller was placed in an electric oven set at 305° C. and held for 30 minutes so that the thermally shrinkable tube was shrunken and, at the same time, the PFA in the primer layer was melted and the tube was fused with the rubber roller. Thus, a fixing belt was provided. The thermally shrinking percentage of the tube was 4.1%.

Immediately after the fixing belt was taken out of the oven, redundant portions of the tube were cut off from the fixing belt; the shaft was removed from the base; and the fixing belt was placed in an electric oven maintained at 340° C. and reheated by being held for 7 minutes.

The fixing belt was taken out of the electric oven. While the ends of the fixing belt were supported, cold air at 10° C. was blown from a blower to the fixing belt in the axial direction for 70 seconds such that the fixing belt was rapidly cooled. The thus-cooled fixing belt was immediately taken out. The surface temperature of the fixing belt was 30° C. The PFA layer formed on the fixing belt had a thickness of about 14.5 μm.

The surface of the fixing belt was inspected for the presence of bubbles. The fixing belt was incorporated into a fixing unit and examined whether cracks were generated or not.

Another fixing belt was produced in Control example 1 in which the same procedures as in Example 1 were performed except that the reheating step was not performed. This fixing belt was also evaluated in terms of bubbles and cracks.

The results in Example 1 and Control example 1 are summarized in Table I below.

Examples 2 and 3, Comparative Examples 1 and 2, and Control Examples 2 to 5

Regarding the Diameter of Thermally Shrinkable Tube

As summarized in Table I below, fixing belts were produced in Examples 2 and 3 and Comparative examples 1 and 2 in which the same procedures as in Example 1 were performed except that, instead of the PFA-tube internal diameter of 17.5 mm in Example 1, the PFA tubes respectively had internal diameters of 18.0, 18.5, 19.0, and 19.5 mm and the PFA tubes were diametrically expanded to 1.1 times the original diameters to provide thermally shrinkable tubes. Other fixing belts were produced in Control examples 2 to 5 in which the same procedures as in Examples 2 and 3 and Comparative examples 1 and 2 were respectively performed except that the reheating step was not performed. The fixing belts were also evaluated in terms of bubbles and cracks. The results in Examples 2 and 3, Comparative examples 1 and 2, and Control examples 2 to 5 are summarized in Table I below.

TABLE I

| | Rubber roller outer diameter (mm) | PFA tube inner diameter (mm) | | | Characteristics | | Reheating step |
|---|---|---|---|---|---|---|---|
| | | Before diametral expansion | After diametral expansion | After thermal shrinkage | Bubbles | Cracks | |
| Example 1 | 18.5 | 17.5 | 19.3 | 18.5 | A | A | Performed |
| Example 2 | 18.5 | 18.0 | 19.8 | 18.5 | A | A | Performed |
| Example 3 | 18.5 | 18.5 | 20.4 | 18.5 | B | A | Performed |
| Comparative example 1 | 18.5 | 19.0 | 20.9 | 19.0 | C | A | Performed |
| Comparative example 2 | 18.5 | 19.5 | 21.5 | 19.5 | C | A | Performed |
| Control example 1 | 18.5 | 17.5 | 19.3 | 18.5 | A | C | Not performed |
| Control example 2 | 18.5 | 18.0 | 19.8 | 18.5 | A | B | Not performed |
| Control example 3 | 18.5 | 18.5 | 20.4 | 18.5 | B | B | Not performed |
| Control example 4 | 18.5 | 19.0 | 20.9 | 19.0 | C | A | Not performed |
| Control example 5 | 18.5 | 19.5 | 21.5 | 19.5 | C | A | Not performed |

From the results in Examples 1 to 3, when the inner diameter of the PFA tube is equal to or smaller than the outer diameter of the rubber roller and the reheating step is performed, the resultant fixing belt does not contain or scarcely contains bubbles and axial cracks are not generated during long-term usage of the fixing belt. In Example 3 in which the inner diameter of the PFA tube was equal to the outer diameter of the rubber roller, though a small number of bubbles were observed, images were formed without problems; and, in addition, images were formed without problems and axial cracks were not generated during long-term usage of the fixing belt.

In contrast, as in Comparative examples 1 and 2, when the inner diameter of the PFA tube is larger than the outer diameter of the rubber roller, the thermally shrunken tube is not tightly bonded to the rubber roller and the resultant fixing belt contains bubbles.

As in Control examples 1 and 2, when the inner diameter of the PFA tube is less than the outer diameter of the rubber roller but the reheating step is not performed, axial cracks are generated during long-term usage of the fixing belt. In Control example 3 in which the inner diameter of the PFA tube was equal to the outer diameter of the rubber roller, a small number of axial cracks were generated and a small number of bubbles caused partial delamination of the PFA layer from the rubber roller during long-term usage of the fixing belt.

Example 4 and Control Example 8

Regarding Fusion Temperature

A fixing belt in Example 4 was produced by the same procedures (including the reheating step) as in Example 2 except that, in the PFA-layer-forming step, the temperature of the oven used for fusing the thermally shrinkable tube with the rubber roller was changed from 305° C. to 290° C. Another fixing belt was produced in Control example 8 in which the same procedures as in Example 4 were performed except that the reheating step was not performed.

These fixing belts were measured in terms of adhesion strength and micro-hardness and the results are summarized in Table II below.

Examples 5 to 10, Comparative Examples 3 and 4, and Control Examples 6, 7, and 9 to 14

Fixing belts in Examples 5 to 10 and Comparative examples 3 and 4 were produced by the same procedures (including the reheating step) as in Example 4 except that, in the PFA-layer-forming step, the temperature of the oven was changed from 290° C. to the temperatures described in Table II. Other fixing belts were respectively produced in Control examples 6, 7, and 9 to 14 in which the same procedures as in Comparative examples 3 and 4 and Examples 5 to 10 were performed except that the reheating step was not performed. These fixing belts were measured in terms of adhesion strength and micro-hardness.

The results of Examples 5 to 10, Comparative examples 3 and 4, and Control examples 6, 7, and 9 to 14 are summarized in Table II below.

TABLE II

| | | Characteristics | | |
|---|---|---|---|---|
| | Fusion temperature (° C.) | Adhesion strength (gf/cm) | Micro-hardness | Reheating step |
| Comparative example 3 | 280 | 90 | 78 | Performed |
| Control example 6 | 280 | 0 | 77 | Not performed |
| Comparative example 4 | 285 | 90 | 79 | Performed |
| Control example 7 | 285 | 0 | 78 | Not performed |
| Example 4 | 290 | 260 | 79 | Performed |
| Control example 8 | 290 | 250 | 78 | Not performed |
| Example 5 | 295 | 260 | 80 | Performed |
| Control example 9 | 295 | 250 | 79 | Not performed |
| Example 6 | 300 | 255 | 80 | Performed |
| Control example 10 | 300 | 250 | 79 | Not performed |
| Example 7 | 305 | 255 | 82 | Performed |
| Control example 11 | 305 | 250 | 81 | Not performed |
| Example 8 | 310 | 220 | 84 | Performed |

TABLE II-continued

| | Characteristics | | | |
|---|---|---|---|---|
| | Fusion temperature (° C.) | Adhesion strength (gf/cm) | Micro-hardness | Reheating step |
| Control example 12 | 310 | 220 | 83 | Not performed |
| Example 9 | 315 | 180 | 85 | Performed |
| Control example 13 | 315 | 180 | 84 | Not performed |
| Example 10 | 320 | 145 | 85 | Performed |
| Control example 14 | 320 | 150 | 84 | Not performed |

From the results in Table II, in the fixing belts in Examples 4 to 10, by performing the PFA-layer-forming step at temperatures equal to or higher than the crystallization temperature (290° C.) of the PFA contained in the thermally shrinkable tube, the adhesion strength between the PFA layer and the rubber elastic layer is excellent. When the fixing belts in Examples 4 to 10 in which the reheating step was performed are compared with Control examples 8 to 14 in which the reheating step was not performed, the difference in micro-hardness between the presence and absence of the reheating step is about 1. Accordingly, the reheating step does not adversely affect the fixing performance.

In particular, in Examples 4 to 7, by performing the PFA-layer-forming step at temperatures lower than the melting point (310° C.) of the PFA forming the PFA layer, the fixing belts have a high adhesion strength of 250 gf/cm or more. In addition, these fixing belts have a micro-hardness of 82 or less and hence can conform in accordance with pressing by toner. Accordingly, the fixing belts have a high toner-stain suppressing function, which is preferable.

In contrast, in Comparative examples 3 and 4, since the PFA-layer-forming step was performed at temperatures lower than the crystallization temperature of the PFA contained in the thermally shrinkable tube, the adhesion strength between the PFA layer and the rubber elastic layer was low and the fixing belts were not practically usable. The fixing belts in Control examples 6 and 7 are different from the fixing belts in Comparative examples 3 and 4 in that the reheating step was not performed. Accordingly, in the production of the fixing belts in Control examples 6 and 7, the PFA contained in the PFA layer and the low-melting fluorocarbon resin contained in the primer layer were not melted. Thus, these fixing belts have no adhesion strength between the PFA layer and the rubber elastic layer and hence are not practically usable.

INDUSTRIAL APPLICABILITY

A method for producing a fixing-unit member according to an embodiment of the present invention can provide a fixing-unit member such as a fixing roller that is good in terms of releasability, wear resistance, fixability, or the like and that is particularly excellent in terms of durability. In a method for producing a fixing-unit member according to an embodiment of the present invention, bubbles are not generated between a PFA layer and a rubber elastic layer of a roller and internal stress remaining in the PFA layer is released and, as a result, the method can provide a fixing-unit member in which axial cracks are not generated during long-term usage of the fixing-unit member.

What is claimed is:

1. A method for producing a fixing-unit member including a base, a rubber elastic layer, and a tetrafluoroethylene-perfluoro(alkyl vinyl ether) copolymer (PFA) layer containing 70 wt % or more of a PFA, the method comprising:
   (I) a primer-layer-forming step of forming a primer layer by applying a primer to an outer circumferential surface of a rubber roller prepared by forming the rubber elastic layer on an outer circumferential surface of the base, the primer containing a fluorocarbon resin that has a melting point equal to or lower than a melting point of the PFA contained in the PFA layer;
   (II) a rubber-roller-sheathing step of sheathing the rubber roller including the primer layer, with a thermally shrinkable tube formed by diametrically expanding a PFA tube so as to have an inner diameter more than an outer diameter of the rubber roller including the primer layer, the PFA tube containing 70 wt % or more of the PFA and having an inner diameter equal to or less than the outer diameter of the rubber roller including the primer layer;
   (III) a PFA-layer-forming step of forming the PFA layer from the thermally shrinkable tube by heating the thermally shrinkable tube around the rubber roller to a temperature equal to or higher than a crystallization temperature of the PFA contained in the thermally shrinkable tube so that the thermally shrinkable tube is thermally shrunken and is fused with the rubber roller including the primer layer, with the primer layer between the thermally shrinkable tube and the outer circumferential surface of the rubber roller; and
   (IV) a reheating step of heating the PFA layer to a temperature equal to or higher than the melting point of the PFA contained in the PFA layer,
   further comprising, after the reheating step, a rapid-cooling step of cooling the PFA layer at a rate of 200° C./min or higher in a manner such that cold air at 1° C. to 25° C. is blown to the PFA layer for 15 to 90 seconds,
   wherein, prior to the PFA-layer-forming step, a preheating step of preheating the rubber roller sheathed with the thermally shrinkable tube in a temperature range of 150° C. to 250° C. and for a time range of 5 to 100 minutes in an electric oven.

2. The method according to claim 1, wherein, in the PFA-layer-forming step, the temperature to which the thermally shrinkable tube is heated is lower than the melting point of the PFA contained in the thermally shrinkable tube.

3. The method according to claim 1, wherein the PFA layer has a thickness of 50 μm or less.

4. The method according to claim 1, wherein the PFA tube is formed by extrusion in a temperature range of 380° C. to 440° C.

5. The method according to claim 1, wherein the PFA-layer-forming step is performed while a metal shaft is inserted through the base.

6. The method according to claim 5, wherein the reheating step is performed without the metal shaft inserted through the base.

7. The method according to claim 1, wherein the base is composed of a metal or a heat-resistant resin.

8. The method according to claim 1, wherein the rubber elastic layer is composed of a rubber composition containing a thermally conductive filler and at least one heat-resistant rubber selected from the group consisting of silicone rubber and fluorocarbon rubber.

9. The method according to claim 1, wherein the fixing-unit member is a fixing roller or a fixing belt.

10. The method according to claim 1, wherein the fixing-unit member is a pressing roller or a pressing belt.

* * * * *